United States Patent
Freis

(10) Patent No.: US 9,718,157 B2
(45) Date of Patent: Aug. 1, 2017

(54) EXPANDING DIE FOR CLINCHING AND RIVETING OPERATIONS

(71) Applicant: Ford Global Technologies, LLC, Dearborn, MI (US)

(72) Inventor: Amanda Kay Freis, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 479 days.

(21) Appl. No.: 14/186,395

(22) Filed: Feb. 21, 2014

(65) Prior Publication Data

US 2015/0239077 A1    Aug. 27, 2015

(51) Int. Cl.
| | |
|---|---|
| *B23P 19/04* | (2006.01) |
| *B21D 39/03* | (2006.01) |
| *B21J 15/36* | (2006.01) |
| *B21J 15/02* | (2006.01) |
| *B29C 65/00* | (2006.01) |

(52) U.S. Cl.
CPC ............ *B23P 19/04* (2013.01); *B21D 39/031* (2013.01); *B21J 15/025* (2013.01); *B21J 15/36* (2013.01); *B29C 66/7212* (2013.01); *Y10T 29/49936* (2015.01); *Y10T 29/49943* (2015.01); *Y10T 29/5377* (2015.01); *Y10T 29/53709* (2015.01)

(58) Field of Classification Search
CPC ........... B23P 19/00; B23P 11/00; B23P 19/04; B21D 39/03; B21D 39/031; B21J 15/36; B21J 15/025; Y10T 29/53709; Y10T 29/5377; Y10T 29/49936; Y10T 29/49943

USPC ............. 29/243.53, 432.1, 525.05, 509, 505, 29/525.01, 437, 283, 521, 243.5, 283.5; 27/798; 269/29; 72/347, 349, 343, 380, 72/708, 354.2, 466.9; 413/69
See application file for complete search history.

(56) References Cited

U.S. PATENT DOCUMENTS

| | | | | |
|---|---|---|---|---|
| 2,382,359 | A | * | 8/1945 | Weightman ................ B21J 9/06 29/282 |
| 2,473,673 | A | * | 6/1949 | Bell ......................... B21D 3/16 72/397 |
| 3,993,010 | A | * | 11/1976 | Taniuchi ................ B65D 17/24 413/12 |

(Continued)

FOREIGN PATENT DOCUMENTS

WO    03/064105    8/2003

OTHER PUBLICATIONS

RIVCLINCH® (Spot Clinch®) 0404 IP Light and fast clinching tool; Bollhoff Attexor SA; Aug. 2014.*

(Continued)

*Primary Examiner* — Larry E Waggle, Jr.
*Assistant Examiner* — Mahdi H Nejad
(74) *Attorney, Agent, or Firm* — Damian Porcari; Brooks Kushman P.C.

(57) ABSTRACT

A die for use with a cold-formed joint tool such as a clinching tool or clinch punch or self-piercing rivet punch. A split die made of a plurality of partial cup-shaped segments is disposed within a collar that defines a recess. The recess includes a forming area in which the cold-formed joint is formed and a relieved area in which the partial cup-shaped segments are shifted radially outwardly after forming to permit removal of the cold-formed joint tool from the cold-formed joint.

19 Claims, 5 Drawing Sheets

(56) References Cited

U.S. PATENT DOCUMENTS

| | | | | |
|---|---|---|---|---|
| 4,064,617 A * | 12/1977 | Oaks | ................. | B23P 19/062 29/283.5 |
| 4,067,564 A * | 1/1978 | Kobane, Jr. | ............ | B23Q 3/108 269/310 |
| 4,130,932 A * | 12/1978 | Epmeier | ................ | B21D 39/06 285/382.5 |
| 4,776,197 A * | 10/1988 | Scott | ................. | B21K 21/10 72/355.6 |
| 5,027,503 A * | 7/1991 | Sawdon | ............... | B21D 39/031 29/283.5 |
| 5,051,020 A * | 9/1991 | Schleicher | .......... | B21D 39/031 29/521 |
| 5,267,383 A * | 12/1993 | Sawdon | ............... | B21D 39/031 29/243.5 |
| 5,315,743 A * | 5/1994 | Schleicher | .......... | B21D 39/031 29/243.5 |
| 5,479,687 A * | 1/1996 | Sawdon | ............... | B21D 39/031 29/243.5 |
| 5,528,815 A * | 6/1996 | Webb | .................. | B21D 39/031 29/243.5 |
| 5,560,094 A * | 10/1996 | Ladouceur | ............ | B23P 19/062 29/243.518 |
| 5,581,860 A * | 12/1996 | Sawdon | ............... | B21D 39/031 29/243.5 |
| 6,044,934 A * | 4/2000 | Nemeth | ............... | F15B 15/262 188/265 |
| 6,427,302 B2 * | 8/2002 | Piantoni | .............. | B21D 39/048 29/243.5 |
| 6,763,568 B1 * | 7/2004 | Mauermann | ........... | B21J 15/025 29/243.53 |
| 6,964,094 B2 * | 11/2005 | Kondo | ................. | B21J 15/025 29/243.53 |
| 6,986,301 B2 * | 1/2006 | Wade | .................. | B21D 39/031 83/684 |
| 7,003,861 B2 * | 2/2006 | Sawdon | ............... | B21D 39/031 29/283.5 |
| 7,047,617 B2 * | 5/2006 | Ladouceur | ............ | B23P 19/062 29/283.5 |
| 7,150,086 B2 * | 12/2006 | Rapp | .................... | B21D 39/031 29/283.5 |
| 7,287,411 B2 * | 10/2007 | Kuhne | ................ | B21D 39/031 29/432.1 |
| 7,293,549 B2 * | 11/2007 | Kaishio | ................ | F16L 55/132 123/456 |
| 7,322,086 B2 * | 1/2008 | Humpert | .............. | B23P 19/062 29/21.1 |
| 7,412,869 B2 * | 8/2008 | Kato | .................... | B21J 15/025 29/432.2 |
| 7,581,300 B2 * | 9/2009 | Babej | .................... | B21D 39/00 29/505 |
| 7,870,656 B2 | 1/2011 | Eberlein | | |
| 2003/0154588 A1 | 8/2003 | Blacket et al. | | |
| 2004/0170473 A1 * | 9/2004 | Rapp | .................... | B21D 39/031 403/408.1 |
| 2005/0161965 A1 | 7/2005 | Eberlein | | |
| 2006/0208499 A1 * | 9/2006 | Rusiana | ............... | E05B 15/101 292/170 |
| 2008/0120830 A1 * | 5/2008 | Baughman | ............ | B21D 51/40 29/700 |
| 2008/0177512 A1 | 7/2008 | Wenzel et al. | | |
| 2010/0242567 A1 * | 9/2010 | Nardini | ................. | B21D 22/24 72/379.4 |
| 2011/0126396 A1 | 6/2011 | Clarke et al. | | |
| 2013/0071181 A1 | 3/2013 | Herzinger et al. | | |
| 2014/0212616 A1 * | 7/2014 | McKelvey Campbell | ............... | B23P 11/00 428/43 |
| 2015/0101170 A1 * | 4/2015 | Freis | .................... | B21D 39/031 29/432.2 |

OTHER PUBLICATIONS

TOX_Applications_200.201507.en; www.tox-en.com.*
TOX_Joining_Systems_80.201411.en; www.tox-en.com.*

* cited by examiner

EXPANDING DIE FOR CLINCHING AND RIVETING OPERATIONS

TECHNICAL FIELD

This disclosure relates to a die that is placed on the opposite side of an assembly to be joined in either a clinching tool in a clinching operation or a self-piercing rivet tool in a self-piercing riveting operation.

BACKGROUND

In body-in-white structures, joining methods have traditionally relied on resistance-spot welding (e.g., in steel structures). Interest in alternative materials has increased as the automotive industry continues to focus on reducing the weight of vehicles to meet customer expectations on fuel economy and CAFE requirements. In the case of aluminum intensive vehicles and other mixed metal joining applications, problems associated with welding aluminum have led to the adoption of cold-formed joint technologies, such as clinching and self-piercing rivets (SPR) that are currently the most prevalent technique used for forming joints. One advantage of SPR technology is that it is a high production volume assembly process.

Clinch joints offer the potential of added cost savings. If parts are secured together with a clinch joint, the cost of a specialized rivet can be saved. However, clinch joints tend to be weaker than SPR joints because they do not have the same degree of interlock. The reduced strength of clinch joints limits the potential applications for clinch joints. There is a need for increased strength clinch in joints and SPR joints.

Another problem with clinch joints and self-piercing rivets is that the bottom layer of the assembly is thinned when the joint is formed and may result in the rivet or clinch joint breaking through the bottom panel causing a corrosion concern. Both clinch joints and self-piercing rivets can be more widely used if the potential for breakthrough can be reduced.

The above problems and other problems are addressed by this disclosure as summarized below.

SUMMARY

A multi-part die is disclosed that has a concave inner sidewall that is movably retained within a collar to increase the degree of interlock that may be created in a clinching operation or a self-piercing riveting (SPR) operation. The multi-part die is also intended to reduce bottom layer thinning and the potential for breakthrough for both clinching and SPR joints.

According to one aspect of this disclosure, a die for a cold-formed joint tool is disclosed that comprises a split die having a concave inner surface that is received in a collar defining a recess having a forming area and a relieved area. The split die is compressed within the forming area when forming a cold-formed joint and expanded in the relieved area to facilitate removal of the die from the cold-formed joint. A radial biasing member biases the split die to expand in the relieved area. In addition, an axial biasing member may be provided to engage the split die to bias the split die to move between the forming area and the relieved area.

According to other aspects of this disclosure, the split die may have at least two die parts that define the concave surface for forming the cold-formed joint and each of the die parts includes a partial inner base wall. The biasing member functions to operatively engage the die parts to separate the die parts in the relieved area.

The forming area and the relieved area are coaxially aligned, and the split die alternately reciprocates within the recess to form the cold-formed joint and remove the cold-formed joint from the split die. The die may further comprise a cam surface provided on the collar between the forming area and the relieved area that guides the split die into the forming area and against the radial biasing member.

According to another aspect of this disclosure, a clinching tool is provided for forming a clinch joint in a plurality of panels. The clinching tool includes a clinch punch and a die disposed on an opposite side of the panels from the clinch punch. The die has a plurality of partial cup-shaped segments disposed inside a cup-shaped collar. The panels are formed by the punch into cup-shaped segments that define a side concave button forming surface.

According to other aspects of this disclosure as it relates to the clinching tool, the cup-shaped collar includes a side wall and a base wall. The side wall has an inner surface that includes a forming area and a relieved area that is coaxial with the forming area. The cup-shaped segments reciprocate within the cup-shaped collar. The clinch punch forms the clinch joint against the side button forming surface when the cup-shaped segments are disposed in the forming area. The clinch joint is removed from the die when the cup-shaped segments are disposed in the relieved area.

A radial expansion spring operatively engages the cup-shaped segments to bias the cup-shaped segments apart when the cup-shaped segments are disposed in the relieved area. In addition, an axially biasing spring may operatively engage the cup-shaped segments and the cup-shaped collar to bias the cup-shaped segments axially toward the relieved area.

The forming area and the relieved area may be coaxially aligned, and the die may alternately reciprocate within the cup-shaped collar to form the clinch joint and remove the clinch joint from the die. A cam surface may be provided on the collar between the forming area and the relieved area that guides the die into the forming area.

According to other aspects of this disclosure, a riveting tool is disclosed for installing a self-piercing rivet in a plurality of panels. The riveting tool includes a rivet punch and a die disposed on an opposite side of the panels from the rivet punch. The die has a plurality of partial cup-shaped segments disposed inside a cup-shaped collar. Each cup-shaped segment has a concave inner surface. The rivet punch installs the self-piercing rivet into the panels as the panels are forced against the inner surfaces of the cup-shaped segments.

According to other aspects of this disclosure as it relates to the rivet tool, the cup-shaped collar may include a side wall and a base wall. The side wall may have an inner surface that includes a forming area and a relieved area that is coaxial with the forming area. The cup-shaped segments reciprocate within the cup-shaped collar. The rivet punch forms a rivet joint against a button forming surface when the cup-shaped segments are disposed in the forming area. The rivet joint is removed from the die when the cup-shaped segments are disposed in the relieved area.

A radial expansion spring operatively engages the cup-shaped segments to bias the cup-shaped segments apart when the cup-shaped segments are disposed in the relieved area. An axially biasing spring operative engages the cup-shaped segments and the cup-shaped collar to bias the cup-shaped segments axially toward the relieved area.

The forming area and the relieved area are coaxially aligned and the die alternately reciprocates within the cup-shaped collar to form the rivet joint and remove the rivet joint from the die. A cam surface may be provided on the collar between the forming area and the relieved area to guide the die into the forming area.

The above aspects of this disclosure and other aspects will be described in greater detail below with reference to the attached drawings.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
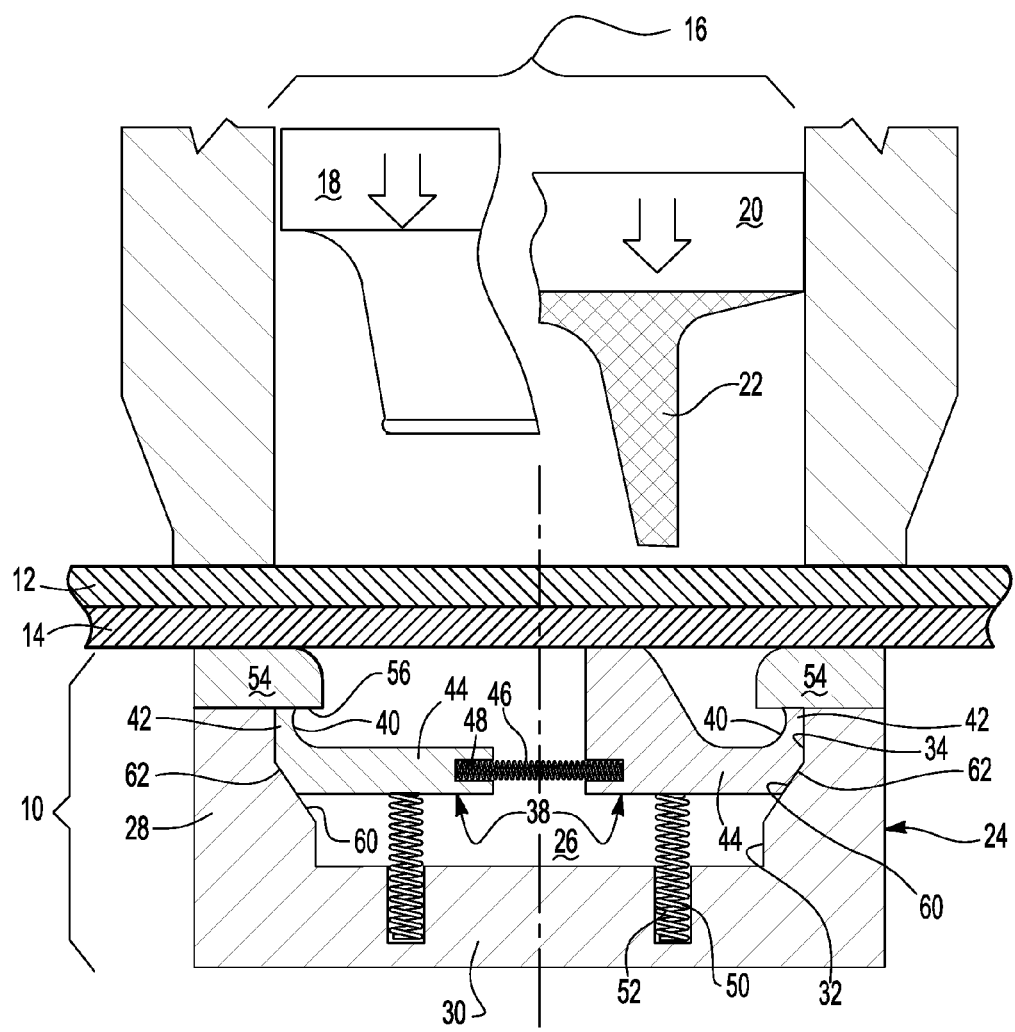
FIG. 1 is a diagrammatic cross-section view of a clinching tool on the left side and of a riveting tool on the right side including a die made according to one aspect of this disclosure in a pre joint forming stage.

Referring to FIGS. 1-4, an expanding die 10 for clinching and riveting operations is illustrated in a sequence of views with FIG. 1 showing the die 10 with a first panel 12 and a second panel 14 disposed on the die 10 in position for forming a cold-formed joint. A cold-formed joint tool 16 is diagrammatically represented to illustrate the invention in either a clinching operation or in a self-piercing rivet operation. A clinch punch 18 is shown on the left side of FIGS. 1-4 and a self-piercing rivet (SPR) punch 20 is shown on the right side of FIGS. 1-4. The self-piercing SPR punch 20 is shown with a self-piercing rivet (SPR) 22 on the right side of FIGS. 1-4.

The die 10 includes a collar 24 that defines a recess 26. The collar 24 includes a side wall 28 and a base wall 30. The side wall 28 includes a forming area 32 that is of reduced circumference and a relieved area 34 that has a greater circumference than the forming area 32. A split die 38, or a die formed by partial cup-shaped segments, is assembled within the collar 24. A concave inner surface 40, or button forming surface, is provided on the inner surface of a side wall 42 of the split die 38. The split die 38 also includes a partial inner base wall 44 that is driven into engagement with the base wall 30 of the collar 24 when the cold-formed joint is formed in the first panel 12 and second panel 14.

A radial spring 46, or biasing member, is received within a radial spring pocket 48 in the partial inner base walls 44. An axial spring 50, or biasing member, is disposed in an axial spring pocket 52. The radial spring 46 biases the split die 38, or partial cup-shaped segments, radially outwardly when the split die 38 is in the relieved area 34. A leaf spring, helical spring or elastomeric member are alternative types of biasing members.

Figure 2:
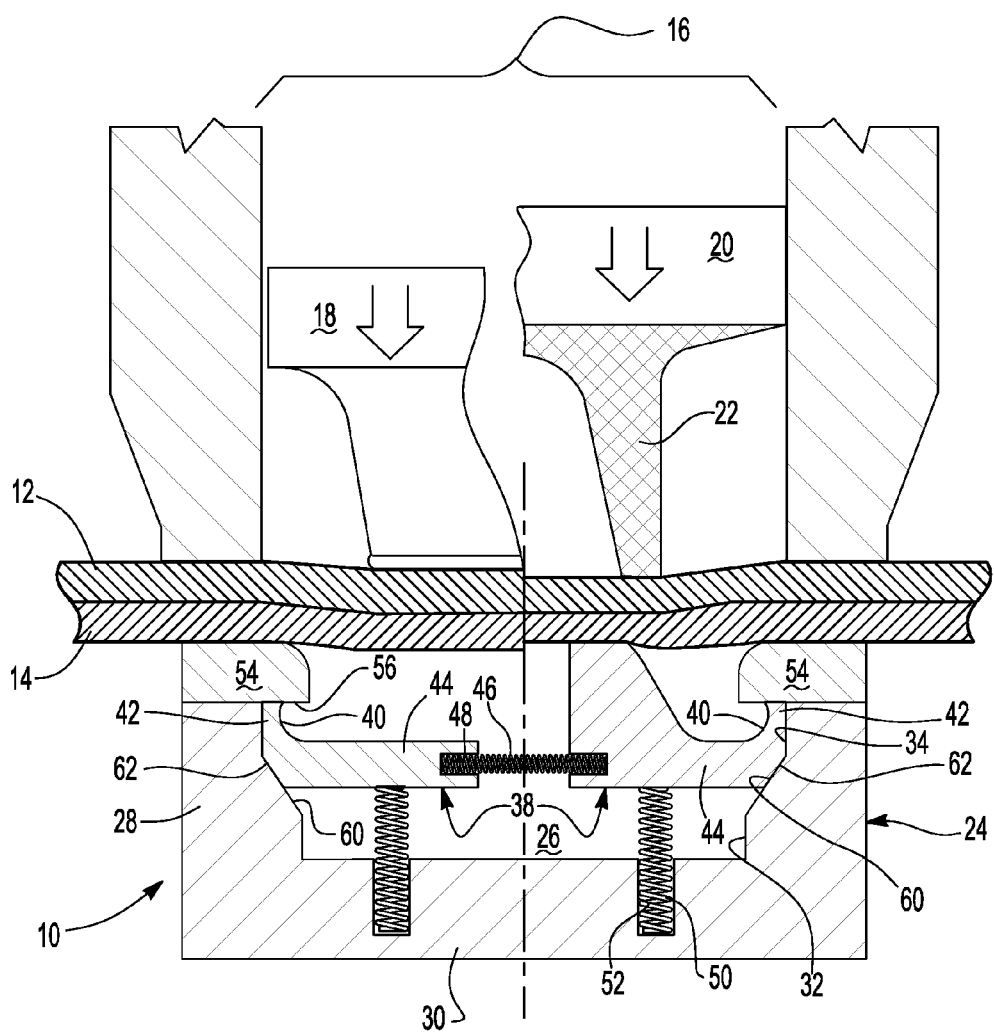
FIG. 2 is a diagrammatic cross-section view of a clinching tool on the left side and of a riveting tool on the right side including a die made according to one aspect of this disclosure in an initial joint forming stage.

The cold-formed joint tool 16 drives the split die 38 into the forming area 32, as shown in FIG. 2. The clinch punch 18, shown on the left side of FIGS. 1-4, engages the first panel 12 and second panel 14 and deforms the panels into the recess 26. The panels engage the partial inner base wall 44 of the split dies 38 to shift the split die 38 from the relieved area 34 into the forming area 32. Axial springs 50, or biasing members, are received in axial spring pockets 52.

The collar 24 includes a die cavity cap 54 that has an overhanging lip 56. The die cavity cap 54 retains the split dies 38 within the recess 26. The overhanging lip 56 engages the side wall 42 of the split dies 38 when the split dies 38 are shifted into the relieved area 34.

Referring to FIG. 2, a beveled cam surface 60 is provided on the collar 24 for guiding the movement of the split die 38 between the forming area 32 and the relieved area 34. A partial cam surface 62 is provided on the split dies 38 that engages the beveled cam surface 60 on the collar 24 as the split die 38 moves between the forming area 32 and the relieved area 34.

Figure 3:
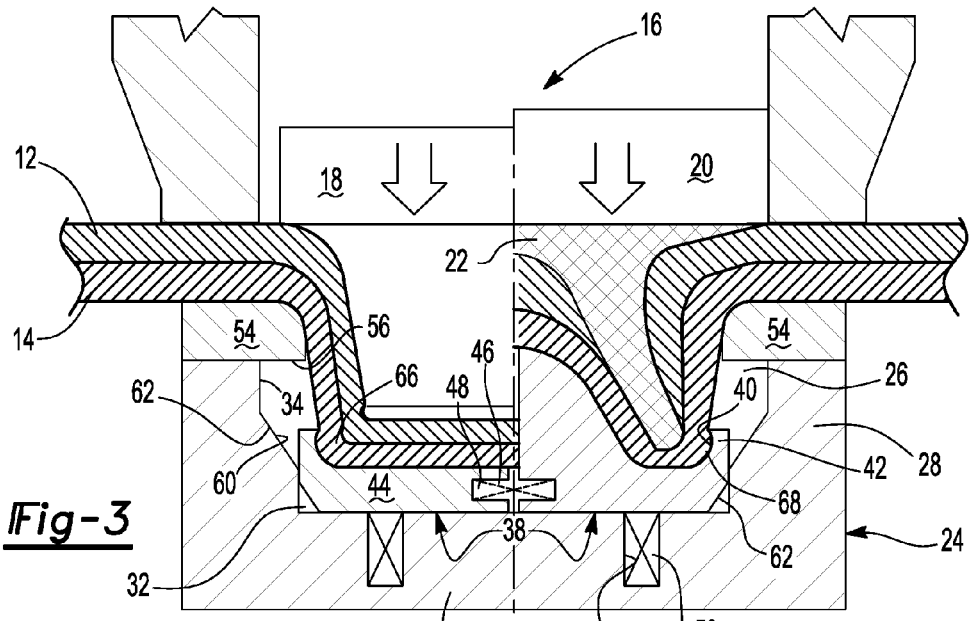
FIG. 3 is a diagrammatic cross-section view of a clinching tool on the left side and of a riveting tool on the right side including a die made according to one aspect of this disclosure in a final joint forming stage.

Referring to FIG. 3, the die 10 is shown with the first panel 12 and second panel 14 joined together by a cold-formed joint. The cold-formed joint is illustrated on the left side of FIG. 3 as a clinch joint 66. The cold-formed joint on the right side of FIG. 3 is illustrated as a rivet joint 68 formed by the self-piercing rivet punch 20 driving a self-piercing rivet 22 into the panels 12 and 14. The split die 38, or partial cup-shaped segments, are disposed in the forming area 32 in FIG. 3 and the cold-formed joint tool 16 is shown driving the panels against the partial inner base walls 44 that, in turn, engage the base wall 30. The radial springs 46 are compressed and disposed within the radial spring pockets 48. The axial springs 50 are shown compressed into the axial spring pockets 52.

Figure 4:
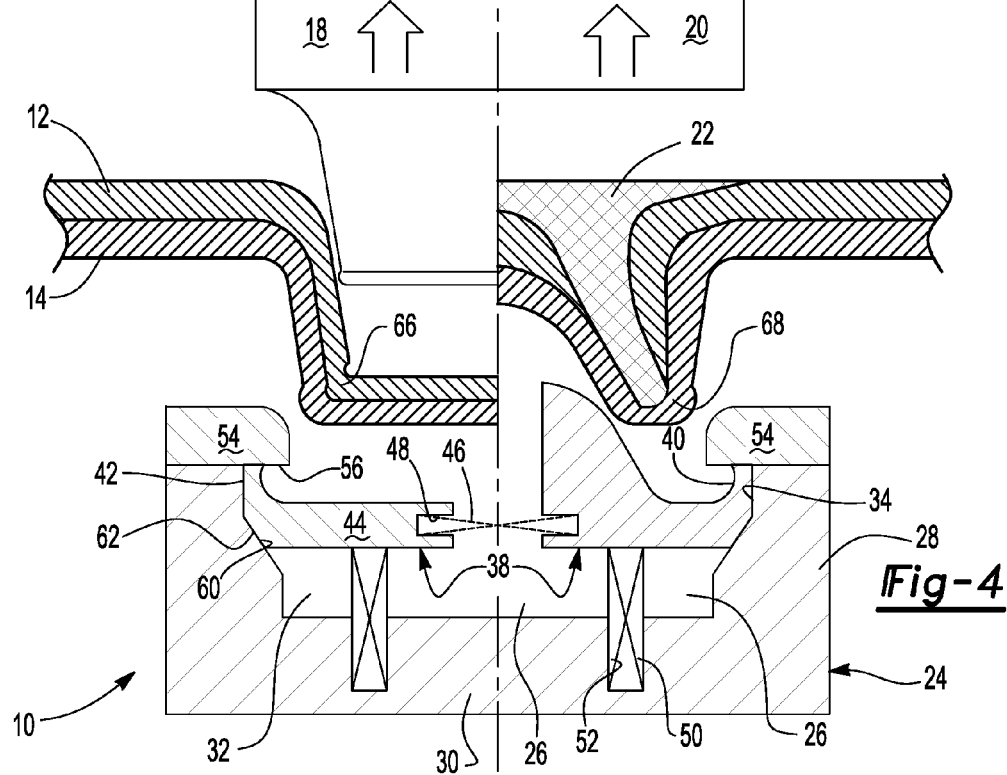
FIG. 4 is a diagrammatic cross-section view of a clinching tool on the left side and of a riveting tool on the right side including a die made according to one aspect of this disclosure in a post joint forming stage with the die releasing the joint.

Referring to FIG. 4, the die 10 is shown with the split die 38, or partial cup-shaped segments, shifted to the relieved area 34. The axial springs 50 bias the split die 38 upwardly. The radial spring 46 exerts a radial expansion force, or outward radial force, on the partial cup-shaped segments 38 of the split die. The partial cam surfaces 62 follow the beveled cam surface 60 on the collar as they shift outwardly radially. The overhanging lip 56 of the die cavity cap 54 stops the upward movement of the split die 38, or partial cup-shaped segments, and retains the split die 38 within the recess 26. As this point, the cold-formed joint, either the clinch joint 66 on the left side or the riveted joint 68 on the right side, is fully formed and may be separated from the split die 38.

Figure 5:
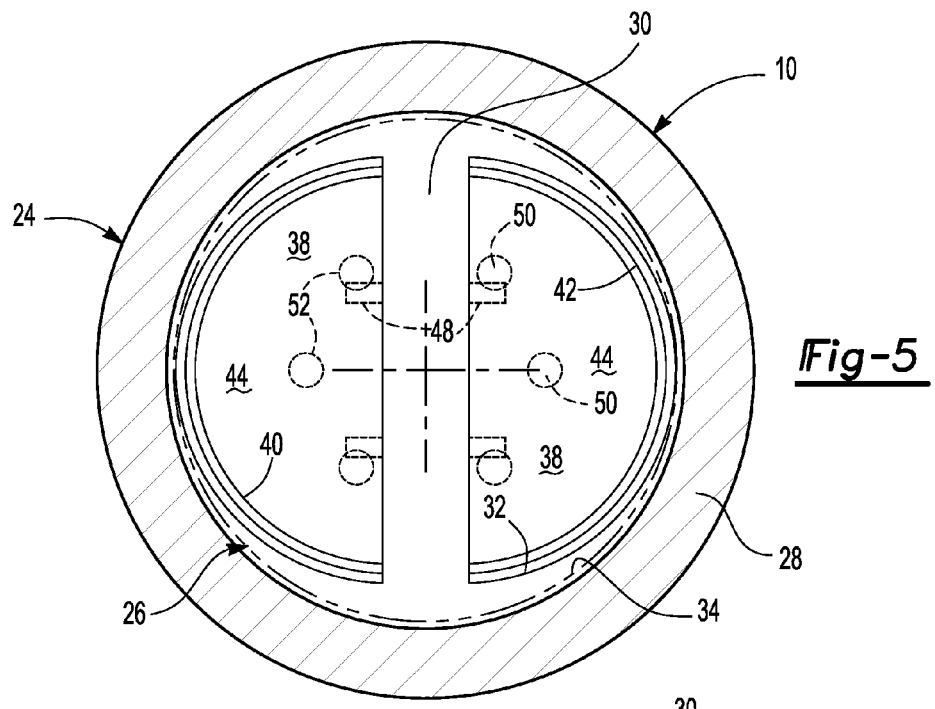
FIG. 5 is a cross-section view taken along the line 5-5 in FIG. 1.
Figure 6:
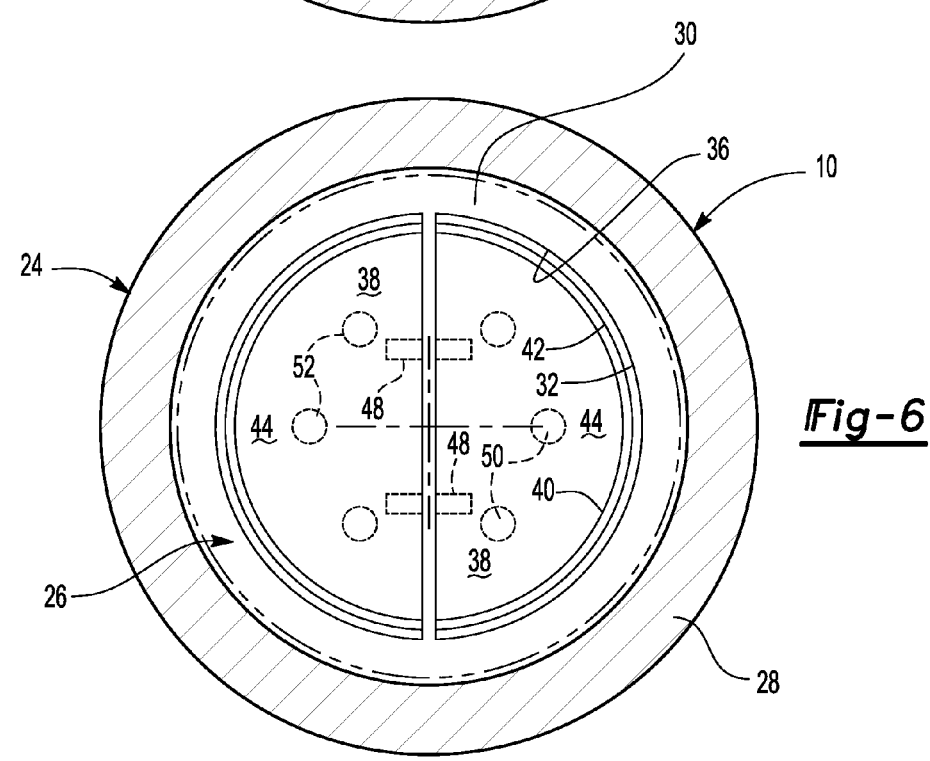
FIG. 6 is a cross-section view taken along the line 6-6 in FIG. 3.

Referring to FIGS. 5 and 6, the die 10 is shown in cross-section. The collar 24 is shown to include a side wall 28 and base wall 30 that form the recess 36. The split die 38 includes two split dies 38. The split dies include a concave inner surface 40 on a side wall 42. A partial inner base wall 44 extends radially inwardly from the side walls 42. The partial inner base walls 44 define the radial inner spring pockets 48 that receive the radial spring 46, or biasing member. Axial spring pockets 52 receive the axial springs (shown in FIGS. 1-4). As shown in FIG. 5, the split dies 38 are separated and disposed in the relieved area 34 that has a greater circumference than the forming area 32.

Referring to FIG. 6, the split dies 38 are shown being received in the forming area 32. In this position, the split dies 38 are held together against the force of the radial springs, shown in FIGS. 1-4. The axial springs 50, shown in FIGS. 1-4, are also compressed with the partial inner base walls 44 of the split dies 38 engaging the base wall 30 shown in FIGS. 1-4.

Figure 7:
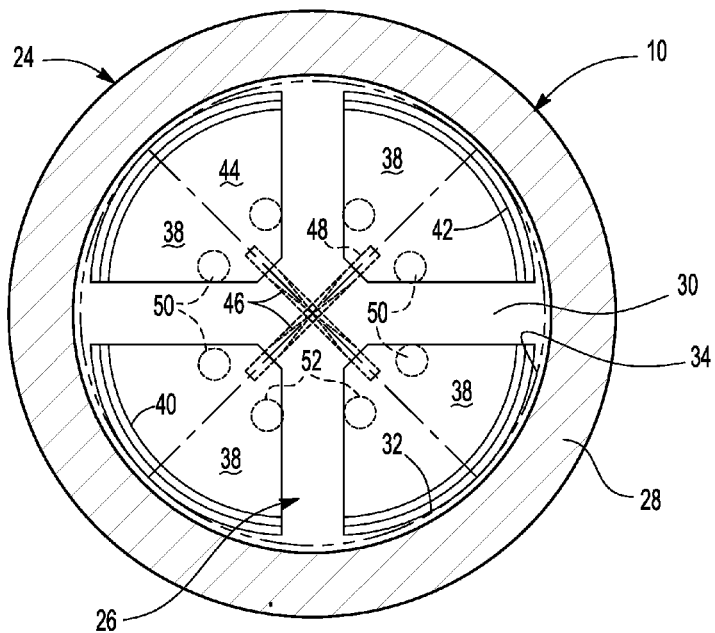
FIG. 7 is a cross-section view similar to FIG. 5 of an alternative embodiment including four cup-shaped die segments.
Figure 8:
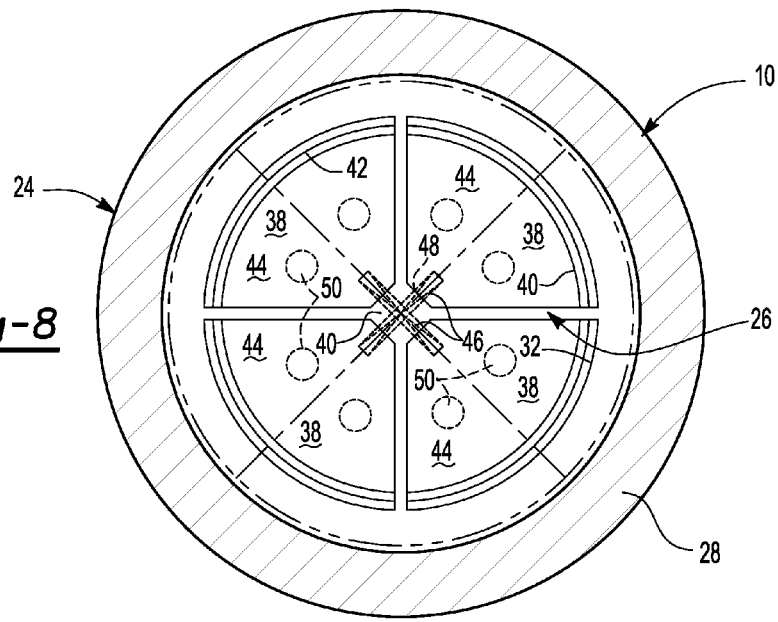
FIG. 8 is a cross-section view similar to FIG. 6 of an alternative embodiment including four cup-shaped die segments.

Referring to FIGS. 7 and 8, an alternative embodiment of the die 10 is shown that includes a four-part split die 38. It should be understood that a three-part split die or a split die having more than four parts could be provided as alternatives. The four partial cup-shaped segments 38 are shown in FIG. 7 separated in the relieved area 34. The radial springs 46 bias the four split dies 38 outwardly to engage the relieved area 34 defined by the recess 26 of the collar 24. The split dies 38, shown in FIG. 7, are in the position that they would be in corresponding to FIGS. 1 and 4 as described above.

Referring to FIG. 8, the alternative embodiment of the die 10 is shown with the four split dies 38 being compressed and disposed within the forming area 32. The radial springs 46 are compressed and the axial springs 50 (shown in FIGS. 1-4) are also compressed with the partial inner base walls 44 of the split dies 38 engaging the base wall 30 of the collar 24.

While several embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A die comprising:
   a collar defining a recess having forming and relieved areas and a cam surface therebetween;
   a split die having a concave inner surface that is compressed within the forming area and radially expanded in the relieved area;
   a spring directly engaging and radially outwardly expanding the split die within the relieved area; and
   a cap secured to the collar, overhanging the recess, and limiting upward movement of the split die.

2. The die of claim 1, wherein the split die has at least two die parts that define the concave surface for forming a cold-formed joint, and wherein each of the parts has a partial inner base wall.

3. The die of claim 2, wherein a biasing member operatively engages the die parts to separate the die parts apart in the relieved area.

4. The die of claim 1, wherein the forming area and the relieved area are coaxially aligned, and wherein the split die reciprocates within the recess to form a cold-formed joint and remove the cold-formed joint from the split die.

5. The die of claim 4, wherein the cam surface guides the split die into the forming area and against the spring.

6. The die of claim 1, wherein the die is configured to form a cold-formed joint and the cold-formed joint is selected from a group consisting essentially of:
   a self-piercing rivet; and
   a clinch joint.

7. The die of claim 1 further comprising an axial biasing member engaging the split die to bias the split die to move between the forming area and the relieved area.

8. A clinching tool comprising:
   a clinch punch on a first side of a plurality of panels;
   a die disposed on a second side of the panels, the die having a plurality of partially cup-shaped segments defining a concave forming surface and being disposed inside a recess defined by a cup-shaped collar, wherein the cup-shaped collar includes a side wall and a base wall, the side wall having an inner surface that includes a forming area, a relieved area that is coaxial with the forming area, and a cam surface between the forming area and the relieved area that guides the die into the forming area, and wherein the clinch punch clinches the panels against the concave forming surface and a spring directly engages the segments to bias the segments radially outwardly after clinching; and
   a cap secured to the collar, overhanging the recess, and configured to restrict upward movement of the die upon engagement therewith.

9. The clinching tool of claim 8, wherein the cup-shaped segments reciprocate within the cup-shaped collar, and wherein the clinch punch forms a clinched joint against the concave forming surface when the cup-shaped segments are disposed in the forming area and the clinch joint is removed from the die when the cup-shaped segments are disposed in the relieved area.

10. The clinching tool of claim 9, wherein the spring operatively engages the cup-shaped segments to bias the cup-shaped segments apart when the cup-shaped segments are disposed in the relieved area.

11. The clinching tool of claim 9 further comprising an axial biasing spring operative engaging the cup-shaped segments and the cup-shaped collar to bias the cup-shaped segments axially toward the relieved area.

12. The clinching tool of claim 9, wherein the forming area and the relieved area are coaxially aligned, and wherein the die alternately reciprocates within the cup-shaped collar to form the clinch joint and remove the clinch joint from the die.

13. The clinching tool of claim 8, wherein the plurality of cup-shaped segments includes four segments.

14. A riveting tool comprising:
   a rivet punch on one side of a plurality of panels;
   a die disposed on another side of the panels, the die having a plurality of partially cup-shaped segments disposed inside a recess defined by a cup-shaped collar, each cup-shaped segment has a concave inner surface, wherein the cup-shaped collar includes a side wall and a base wall, the side wall having an inner surface that includes a forming area, a relieved area that is coaxial with the forming area, and a cam surface between the forming area and the relieved area that guides the die into the forming area, and wherein the rivet punch inserts a self-piercing rivet as the panels are forced against the inner surfaces, after which a spring partially housed in the segments separates the segments; and a cap secured to the collar, overhanging the recess, and configured to restrict upward movement of the die upon engagement therewith.

15. The riveting tool of claim 14, wherein the cup-shaped segments reciprocate within the cup-shaped collar, and wherein the rivet punch forms a rivet joint against a button forming surface when the cup-shaped segments are disposed in the forming area and the rivet joint is removed from the die when the cup-shaped segments are disposed in the relieved area.

16. The riveting tool of claim 15 further comprising a radial expansion spring operatively engaging the cup-shaped segments to bias the cup-shaped segments apart when the cup-shaped segments are disposed in the relieved area.

17. The riveting tool of claim 15 further comprising an axial biasing spring operative engaging the cup-shaped segments and the cup-shaped collar to bias the cup-shaped segments axially toward the relieved area.

18. The riveting tool of claim 15, wherein the forming area and the relieved area are coaxially aligned, and wherein the die alternately reciprocates within the cup-shaped collar to form the rivet joint and remove the rivet joint from the die.

19. The riveting tool of claim 14, wherein the plurality of cup-shaped segments includes four segments.

* * * * *